United States Patent [19]
Karur et al.

[11] Patent Number: 5,703,290
[45] Date of Patent: Dec. 30, 1997

[54] BOBBIN ASSEMBLY FOR A VEHICLE INSTRUMENT GAUGE

[75] Inventors: Chandresekar R. Karur, Plymouth; Ted A. Vanden Berg, Canton; Vivek A. Jairazbhoy, Farmington Hills; Christopher Hitchen, West Bloomfield, all of Mich.

[73] Assignee: Ford Motor Company, Dearborn, Mich.

[21] Appl. No.: 586,388

[22] Filed: Jan. 16, 1996

[51] Int. Cl.[6] .................................................. G01R 1/02
[52] U.S. Cl. .............................. 73/430; 73/431; 324/125; 324/146
[58] Field of Search ..................... 73/430, 431; 324/146, 324/125

[56] References Cited

U.S. PATENT DOCUMENTS

| | | |
|---|---|---|
| 2,779,442 | 1/1957 | Bacon . |
| 3,778,711 | 12/1973 | Samuel .................... 324/125 |
| 4,214,486 | 7/1980 | Gorgens et al. . |
| 4,328,639 | 5/1982 | Cotey . |
| 4,821,571 | 4/1989 | Reymond ................... 73/430 |
| 5,017,862 | 5/1991 | Brooks ..................... 325/125 |
| 5,095,266 | 3/1992 | Ohike et al. ............... 324/125 |
| 5,237,871 | 8/1993 | Henderson et al. . |

FOREIGN PATENT DOCUMENTS

| | | | |
|---|---|---|---|
| 42919 | 3/1983 | Japan ................... | 73/430 |

*Primary Examiner*—Hezron E. Williams
*Assistant Examiner*—Nashmiya Ashraf
*Attorney, Agent, or Firm*—Lynn M. DaDamio

[57] ABSTRACT

A bobbin assembly for a vehicle instrument gauge is provided. The bobbin assembly includes an upper and a lower bobbin, which together define a chamber therebetween and an axis of rotation therethrough. The bobbin assembly also includes a permanent magnet rotatably disposed within the chamber. A shaft rotatably supports the magnet within the chamber for rotative movement about the axis of rotation, and a viscous damping fluid, carried in the chamber, damps the rotational movement of the magnet. The upper bobbin includes a nose portion defining a bore therethrough which extends along the axis of rotation. The bore is open to the chamber and receives the shaft therethrough. The nose portion also defines an inner dam portion disposed within the chamber. The upper bobbin further includes a trough which is in fluid communication with the chamber and extends radially outwardly from the inner dam portion.

1 Claim, 3 Drawing Sheets

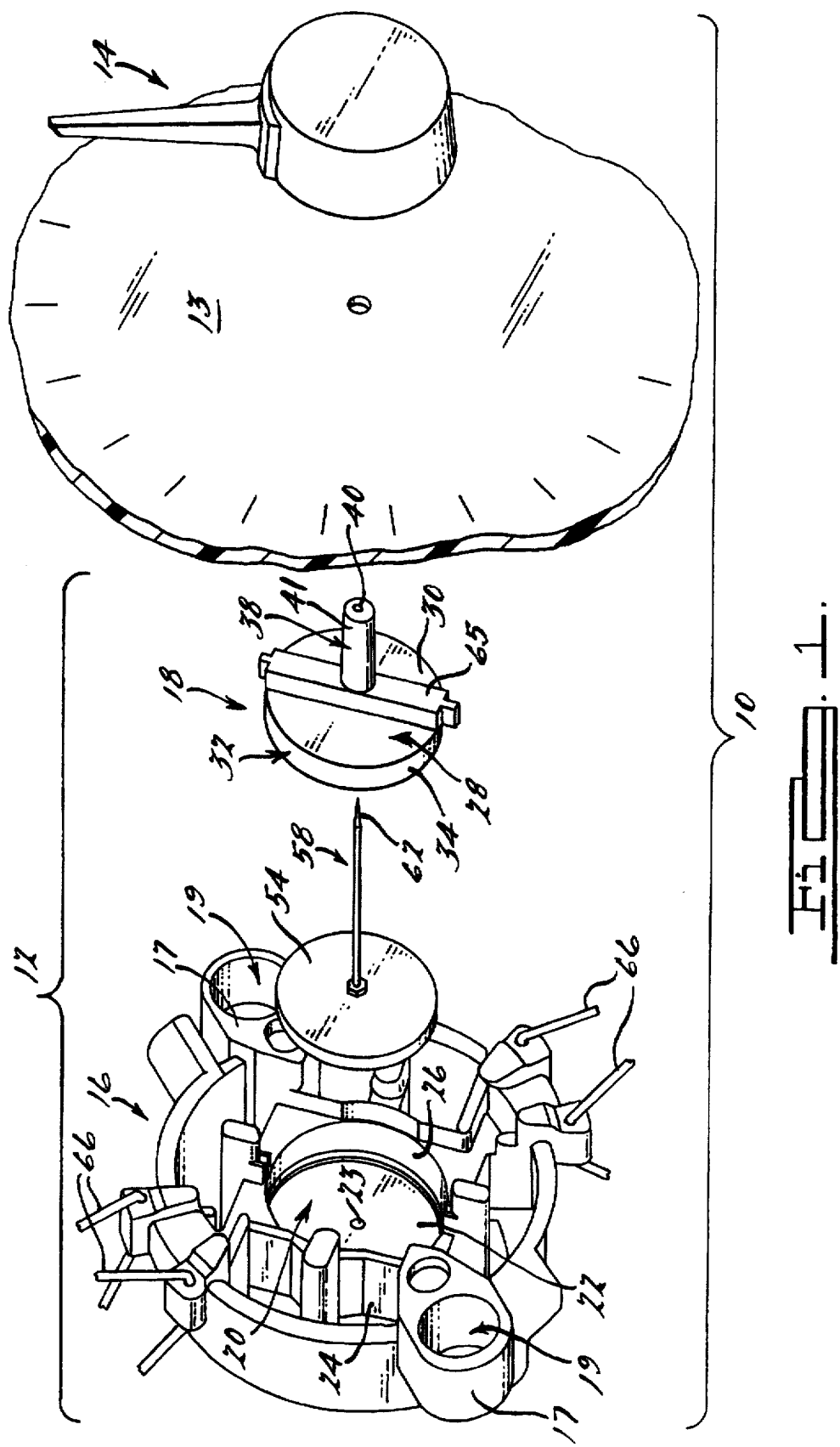

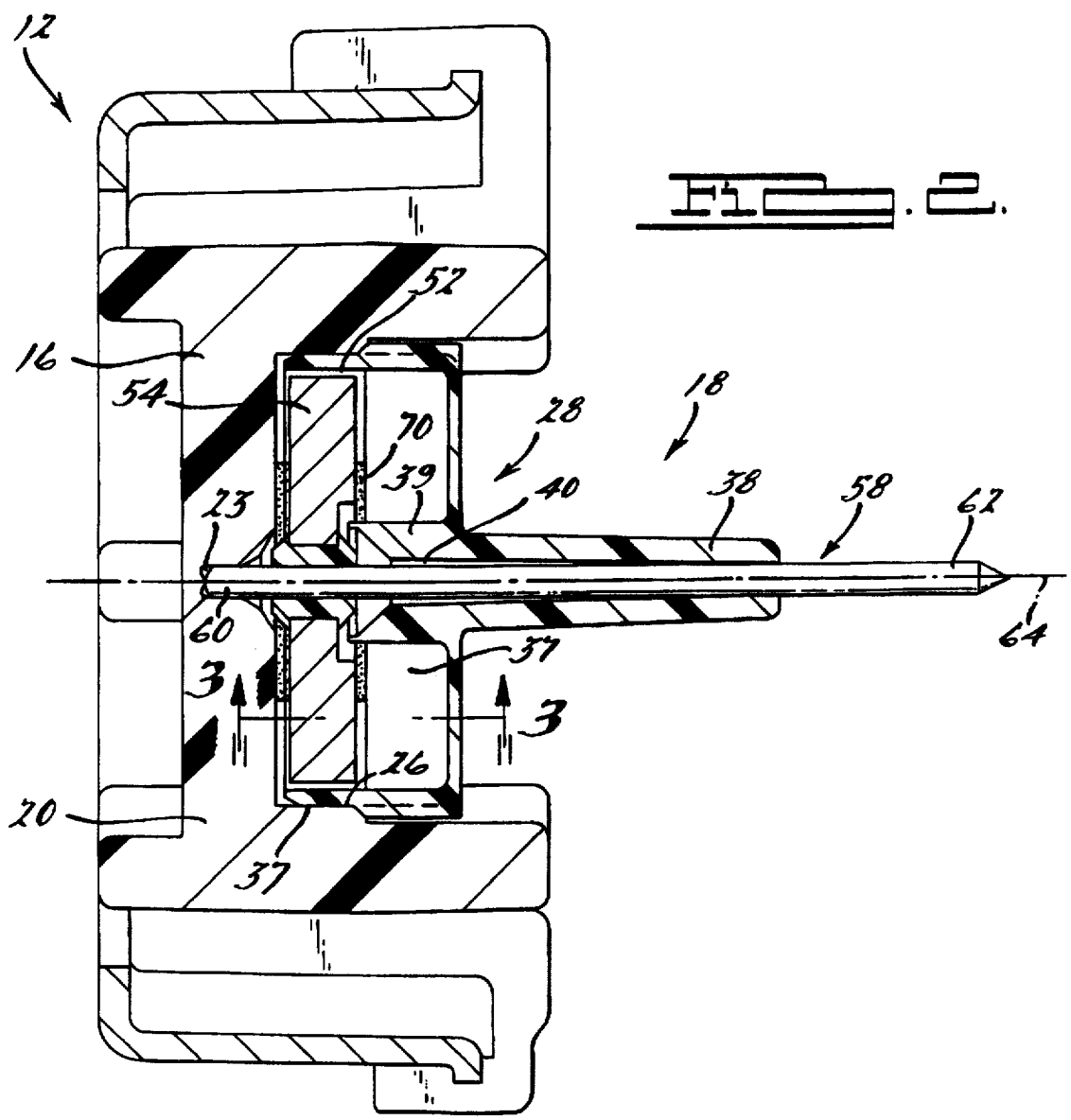
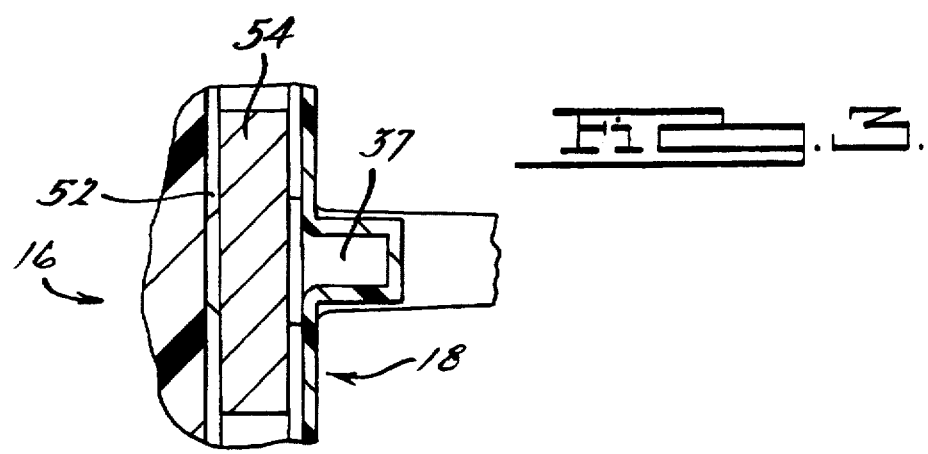

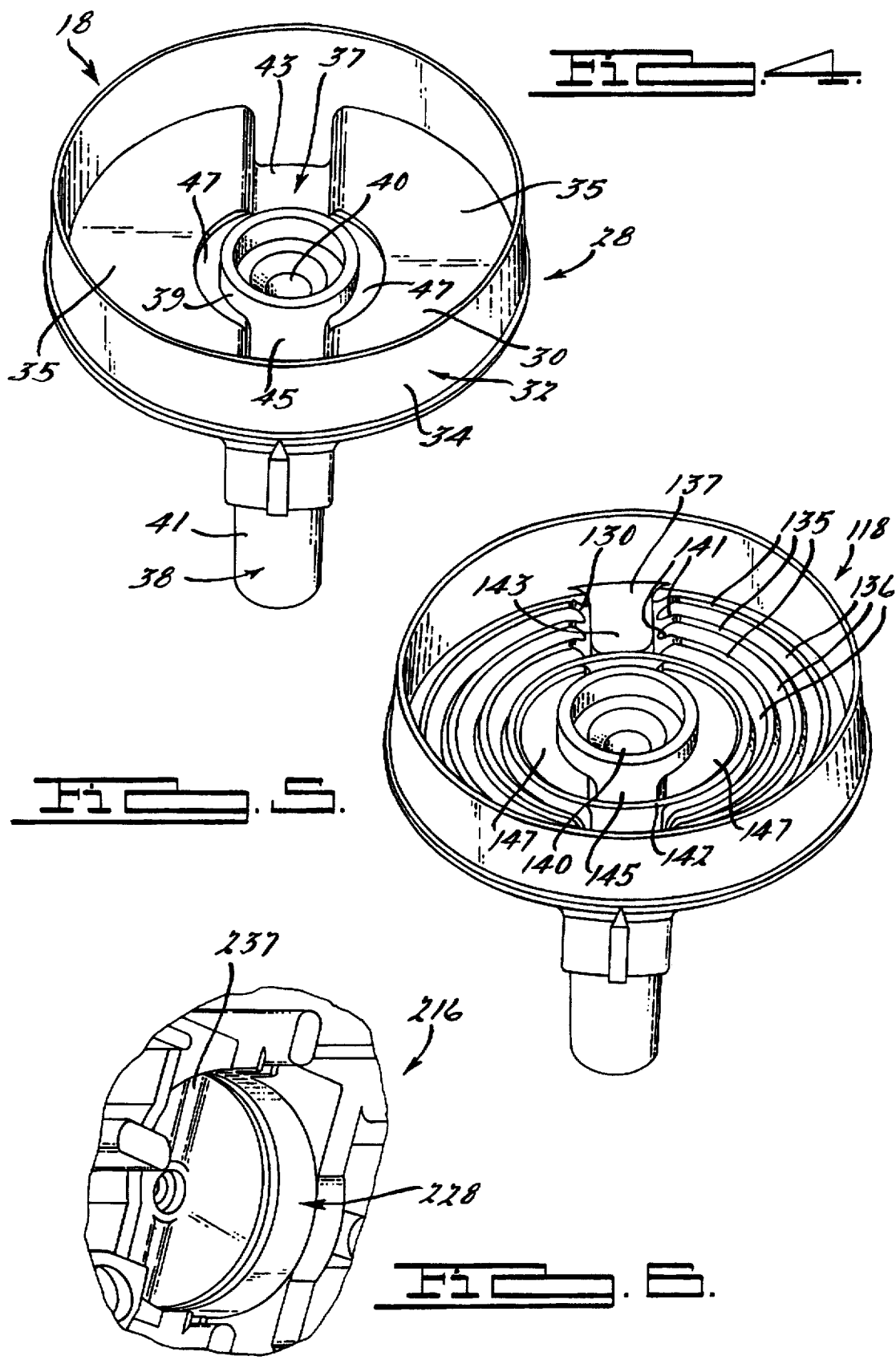

BOBBIN ASSEMBLY FOR A VEHICLE INSTRUMENT GAUGE

BACKGROUND OF THE INVENTION

1. Field of the Invention

The present invention relates generally to vehicle instrument gauges, and more particularly to bobbin assemblies for such gauges.

2. Description of Related Art

Instrument gauges, such as the speedometers, tachometers, fuel and temperature gauges used in modern vehicles, commonly include a pointer body or needle coupled to a permanent magnet. The magnet is generally carried in a plastic housing or bobbin, which is wrapped with wire coils. During operation of the vehicle, current flowing through the coils creates a magnetic field, and the magnet rotates within the bobbin to align itself in force balanced relationship with the field. Since the pointer body rotates with the magnet, positioning of the pointer body is controlled by the direction and magnitude of the current in the coils. To provide for steady movement of the pointer body, a viscous fluid is carried in the bobbin to damp the rotational movement of the magnet.

In instrument gauges of the above-described type, the bobbin is generally a two-piece assembly comprising an upper and a lower bobbin which together define a chamber for holding the magnet and damping fluid. A cylindrical shaft is typically used to couple the pointer body to the magnet. A portion of the shaft generally supports the magnet for rotative movement within the chamber, while another portion of the shaft extends through a bore provided in a nose portion of the upper bobbin, attaching to the pointer body at a location external to the bobbin. Since the bore defines a path through the upper bobbin along which the damping fluid may leak from the bobbin assembly, the bobbin assembly is ideally mounted within the vehicle at some angle above horizontal (i.e., about 20°), such that the upper bobbin is fixed above the lower bobbin. Moreover, the bobbin assembly is ideally always positioned during manufacture and shipping such that the upper bobbin is above the lower bobbin. Inadvertent inversion of the upper and lower bobbins does occur, however, and often results in leakage of the damping fluid through the nose portion of the upper bobbin. Leakage of the fluid from the bobbin assembly can lead to noticeable pointer waiver due to insufficient damping of the magnet within the chamber. Moreover, if the bobbin assembly is already mounted to an instrument panel when the assembly is inverted, leakage of damping fluid out of the nose portion of the upper bobbin may soil the instrument panel display. Therefore, it would be desirable to provide a bobbin assembly for a vehicle instrument gauge having fluid control means for preventing fluid leakage from the nose portion of the upper bobbin.

SUMMARY OF THE INVENTION

The present invention provides an improved, leak-resistant bobbin assembly for a vehicle instrument gauge. The bobbin assembly includes an upper and a lower bobbin, which together define a chamber therebetween and an axis of rotation therethrough. The bobbin assembly also includes a permanent magnet rotatably disposed within the chamber. A shaft rotatably supports the magnet within the chamber for rotative movement about the axis of rotation, and a viscous damping fluid, carried in the chamber, damps the rotational movement of the magnet. The upper bobbin includes a nose portion defining a bore therethrough which extends along the axis of rotation. The bore is open to the chamber and receives the shaft therethrough. The nose portion also defines an inner dam portion disposed within the chamber. The upper bobbin further includes a trough which is in fluid communication with the chamber and extends radially outwardly from the inner dam portion.

According to one aspect of the present invention, the upper bobbin also includes a plurality of annular channels in fluid communication with the trough.

Fluid leakage from the bobbin assembly of the present invention is advantageously minimized by providing a trough within the upper bobbin capable of capturing damping fluid when the bobbin assembly is inverted. Fluid leakage is further minimized by providing annular channels within the upper bobbin for directing fluid flow into the trough.

These and other features and advantages of the present invention will be more fully described below with reference to the following detailed description and drawings.

BRIEF DESCRIPTION OF THE DRAWINGS

FIG. 1 is an exploded perspective view of a bobbin assembly for a vehicle instrument gauge according to the present invention.

FIG. 2 is a sectional view of the bobbin assembly of FIG. 1.

FIG. 3 is a sectional view of the bobbin assembly of FIG. 1 taken along line 3—3 of FIG. 2.

FIG. 4 is a perspective view of an inside surface of an upper bobbin according to the present invention.

FIG. 5 is a perspective view of an alternative embodiment of an inside surface of an upper bobbin according to the present invention.

FIG. 6 is a perspective view of an alternative embodiment of a lower bobbin according to the present invention.

DETAILED DESCRIPTION OF PREFERRED EMBODIMENTS

Turning now to the drawings, and in particular to FIG. 1 thereof, an instrument gauge assembly 10 is illustrated as comprising a bobbin assembly 12, a dial 13, and a pointer 14. Bobbin assembly 12 includes a lower bobbin 16 and an upper bobbin 18, both preferably fabricated from plastic. As depicted in FIG. 1, lower bobbin 16 defines a pair of mounting tabs 17 having apertures 19 therein. Bobbin assembly 12 may be secured to dial 13 in conventional fashion by fastening mounting tabs 17 to a pair of corresponding bosses (not shown) provided on the back face of dial 13. Lower bobbin 16 also defines a generally cup-shaped receptacle 20. Receptacle 20 includes a generally planar end wall 22 having a blind opening 23 positioned generally centrally therein. Receptacle 20 also includes a side wall 24 having a generally cylindrical mating surface 26.

Referring now to FIGS. 1 and 4, upper bobbin 18 is illustrated as comprising a generally cup-shaped plug 28. Plug 28 includes an end wall 30 and a generally cylindrical side wall 32. The outer surface of side wall 32 defines a circumferentially extending mating surface 34. As illustrated in FIG. 4, the inner surface of end wall 30 defines a plurality of generally planar wall portions 35 and a trough 37. Trough 37 preferably has a longitudinal axis extending along the diameter of plug 28. Upper bobbin 18 further comprises a central nose portion 38, having a longitudinal bore 40 extending therethrough.

The longitudinal axis of nose portion 38 is generally perpendicular to end wall 30. An outer portion 41 of nose portion 38 extends axially outwardly from the outer surface of end wall 30, while an inner dam portion 39 of nose portion 38 extends axially inwardly of end wall 30. As illustrated in FIG. 4, inner dam portion 39 divides trough 37 into two diametrically opposed trough portions 43, 45. Each trough portion 43, 45 preferably extends radially outwardly from inner dam portion 39 to side wall 32 of plug 28. Inner dam portion 39 functions to separate trough portions 43, 45 from bore 40 and preferably extends axially inwardly of wall portions 35. As further illustrated in FIG. 4, end wall 30 of plug 28 may include annular recessed portions 47 adjacent inner dam portion 39.

As illustrated in FIG. 2, upper bobbin 18 and lower bobbin 16 are configured such that an interference fit is established between mating surface 34 of plug 28 and mating surface 26 of receptacle 20 when plug 28 is inserted into receptacle 20. Thus, upon assembly of bobbin 16 and 18, plug 28 and receptacle 20 together define a circumferentially sealed chamber 52.

With reference now to FIGS. 1 and 2, bobbin assembly 12 further includes a disc-shaped magnet 54 coupled to a shaft 58. Shaft 58 is secured to magnet 54 in conventional fashion and rotatably supports magnet 54 within chamber 52. One end 60 of shaft 58 is rotatably supported within opening 23 in lower bobbin 16. The other end 62 of shaft 58 extends through bore 40 in nose portion 38 of upper bobbin 18. End 62 passes through dial 13 and is secured to pointer body 14 in conventional fashion outside of upper bobbin 18. As illustrated in FIG. 2, opening 23 and bore 40 define an axis of rotation 64 about which shaft 58, magnet 54 and pointer body 14 are free to rotate.

In a preferred embodiment of the present invention, gauge assembly 10 is an automotive cross-coil type gauge having two generally orthogonal sets of wires (not shown) wrapped in conventional fashion around bobbins 16, 18. As those skilled in the instrumentation arts will understand, care should be taken to position upper bobbin 18 in lower bobbin 16 such that the outer surface 65 of trough 37 does not interfere with the winding of the wires. The wires are electrically connected through terminals 66 (FIG. 1) to a sensor (not shown). During operation of the vehicle, current flows from the sensor through the wires, creating a magnetic field. Magnet 54 responds to the magnetic field by rotating about axis of rotation 64 into force balanced alignment with the field. Pointer body 14, which is coupled to magnet 54 by shaft 58, rotates along with magnet 54 and displays the relevant sensor information on dial 13. To ensure steady movement of pointer body 14, a viscous fluid 70, such as silicone, is carried within chamber 52 for damping the rotational movement of magnet 54.

Ideally, bobbin assembly 12 is mounted within the vehicle such that the longitudinal axis of trough 37 is generally parallel to the transverse axis of the vehicle. If the assembly is mounted in this fashion, fluid 70 should not normally come into contact with trough 37. Rather, all of the fluid 70 should remain in the bottom portion of the chamber, where it is available for damping the movement of magnet 54. The advantage of trough 37 lies in its ability to capture fluid 70 when bobbin assembly 12 is inverted, as most frequently occurs during the manufacture, shipping, and servicing of the assembly. For maximum effectiveness, trough 37 is therefore sized such that its total volume is substantially equal to the volume of fluid 70 carried within chamber 52. Inner dam portion 39 and annular recessed portions 47 help to ensure that any excess fluid not captured by trough 37 is impeded from leaking out of chamber 52 through bore 40.

Turning now to FIG. 5, an alternative embodiment of an upper bobbin 118 according to the present invention is shown. Upper bobbin 118 is substantially similar to the upper bobbin 18 described above except in the provision of a modified end wall 130. The inner surface of end wall 130 comprises a plurality of generally planar wall portions 135, which define a plurality of radially spaced apart annular channels 136 therebetween. Channels 136 are in fluid communication with trough 137 so that any fluid 70 that spills into channels 136 on inversion of the bobbin assembly may be readily directed into trough 137. As illustrated in FIG. 5, the radially inner side walls 141 of channels 136 are preferably substantially vertical to impede fluid 70 from flowing over planar wall portions 135 towards bore 140. End wall 130 of bobbin 118 is preferably also provided with an annular rib 142, which is located radially outward of and adjacent to annular recessed portions 147. Rib 142 extends across trough portions 143 and 145, forming a barrier to fluid flow along the longitudinal axis of trough 137. The additional fluid control features of bobbin 118 described above further reduce the potential for fluid leakage out of bore 140.

With reference now to FIG. 6, an alternative embodiment of a lower bobbin 216 according to the present invention is shown. Lower bobbin 216 is substantially similar to the lower bobbin 16 described above except that a trough 237 is provided therein. Trough 237 preferably has a longitudinal axis extending laterally along the diameter of plug 228. Trough 237 may advantageously serve as an initial repository for the damping fluid during the manufacture of the bobbin assembly.

While the invention has been shown and described in its preferred embodiments, it will be clear to those skilled in the arts to which it pertains that many changes and modifications may be made thereto without departing from the scope of the invention. Modifications which fall within the true scope of this invention are intended to be included within the terms of the appended claims.

What is claimed is:

1. A bobbin assembly for use in a vehicle instrument gauge, comprising:

an upper and lower bobbin together defining a chamber therebetween and an axis of rotation therethrough;

a permanent magnet rotatably disposed within said chamber;

a shaft rotatably supporting said magnet within said chamber for rotative movement about said axis of rotation;

a viscous damping fluid carried in said chamber for damping the rotational movement of said magnet; and said upper bobbin including a nose portion defining a bore therethrough which extends along said axis of rotation, said bore being open to said chamber and receiving said shaft therethrough, said nose portion further including an inner dam portion and two trough portions disposed within said chamber, said inner dam portion having a generally cylindrical continuous wall, said trough portions being in fluid communication with said chamber and extending radially outwardly from said inner dam portion so as to prevent leakage of said viscous damping fluid through said nose portion upon inadvertent inversion of said upper and lower bobbins.

* * * * *